United States Patent
Van Der Schrick

(10) Patent No.: US 10,435,487 B2
(45) Date of Patent: *Oct. 8, 2019

(54) METHOD FOR OPTIMIZING ENERGY EFFICIENCY IN A POLYMERIZATION PROCESS

(71) Applicant: TOTAL RESEARCH & TECHNOLOGY FELUY, Seneffe (Feluy) (BE)

(72) Inventor: Bernard Van Der Schrick, Brussels (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 505 days.

This patent is subject to a terminal disclaimer.

(21) Appl. No.: 14/103,339

(22) Filed: Dec. 11, 2013

(65) Prior Publication Data
US 2014/0150494 A1 Jun. 5, 2014

Related U.S. Application Data

(63) Continuation of application No. 12/670,042, filed as application No. PCT/EP2008/059386 on Jul. 17, 2008, now Pat. No. 8,642,827.

(30) Foreign Application Priority Data

Jul. 23, 2007 (EP) .................................. 07112962

(51) Int. Cl.
*C08F 6/04* (2006.01)
*B01D 3/00* (2006.01)
(Continued)

(52) U.S. Cl.
CPC ............... *C08F 6/04* (2013.01); *B01D 3/007* (2013.01); *B01D 3/143* (2013.01); *B01D 3/32* (2013.01);
(Continued)

(58) Field of Classification Search
CPC ........ F25J 3/0219; F25J 3/0238; F25J 3/0242; F25J 2215/62; F25J 2215/64; C07C 11/02;
(Continued)

(56) References Cited

U.S. PATENT DOCUMENTS 2,909,905 A * 10/1959 Mitchell .................. C10G 5/06
62/238.3
4,143,521 A * 3/1979 Pano ..................... B01J 19/0006
585/634

(Continued)

*Primary Examiner* — Keith M Raymond
*Assistant Examiner* — Webeshet Mengesha
(74) *Attorney, Agent, or Firm* — Albert Shung

(57) ABSTRACT

A process for separation of a hydrocarbon-containing feed stream can include cooling the hydrocarbon-containing feed stream using an absorption refrigeration cycle to form a cooled feed stream. The cooled feed stream can be subjected to distillation conditions to remove a bottom stream including co-monomer; and an overhead stream including hydrocarbon diluents, olefin monomer, and components selected from $H_2$, $N_2$, $O_2$, CO, $CO_2$, and formaldehyde. The overhead stream can be subjected to distillation conditions adapted to remove a bottom stream including substantially olefin-free hydrocarbon diluents; a side stream including hydrocarbon diluent; and an overhead vapor stream including olefin monomer, diluents, and components selected from $H_2$, $N_2$, $O_2$, CO, $CO_2$, and formaldehyde. The overhead vapor stream can be cooled using an absorption refrigeration cycle to form a cooled overhead vapor stream. Olefin monomers can be separated from diluents in the cooled overhead vapor stream.

11 Claims, 5 Drawing Sheets

(51) Int. Cl.
   *B01D 3/14* (2006.01)
   *B01D 3/32* (2006.01)
   *B01D 3/42* (2006.01)
   *C08F 6/00* (2006.01)

(52) U.S. Cl.
   CPC ............ B01D 3/4216 (2013.01); C08F 6/001 (2013.01); *Y02P 20/124* (2015.11)

(58) Field of Classification Search
   CPC ......... C07C 11/04; C07C 11/06; B01D 3/143; B01D 3/14
   USPC .......................................................... 62/935
   See application file for complete search history.

(56) References Cited

U.S. PATENT DOCUMENTS

| | | | | |
|---|---|---|---|---|
| 4,402,795 A * | 9/1983 | Erickson | ................ | B01D 3/007 202/184 |
| 4,449,994 A * | 5/1984 | Hegarty | ................ | F25J 3/0219 62/622 |
| 4,734,115 A * | 3/1988 | Howard | ................ | F25J 3/0219 62/112 |
| 6,045,661 A * | 4/2000 | Kreischer | ................ | B01D 3/06 202/154 |
| 2004/0228775 A1 * | 11/2004 | Ewert | ................... | B01J 31/122 422/131 |

* cited by examiner

METHOD FOR OPTIMIZING ENERGY EFFICIENCY IN A POLYMERIZATION PROCESS

CROSS-REFERENCE TO RELATED APPLICATIONS

This application is a Continuation of U.S. application Ser. No. 12/670,042, filed on Nov. 3, 2010, which claims the benefit of PCT/EP2008/059386, filed on Jul. 17, 2008, which claims priority from EP 07112962.1, filed on Jul. 23, 2007.

FIELD OF THE INVENTION

The present invention relates generally to olefin polymerization. In particular, the present relates to a process for the separation of a hydrocarbon-containing feed stream comprising olefin monomer, co-monomer and hydrocarbon diluent. The present invention also relates to a process for optimizing the separation of an overhead vapor stream comprising olefin monomer and diluent.

BACKGROUND OF THE INVENTION

Polyolefins such as polyethylene and polypropylene may be prepared by particle form polymerization, also referred to as slurry polymerization.

Olefin polymerizations are frequently carried out using monomer, diluent and catalyst and optionally co-monomers and hydrogen in a reactor. The polymerization is usually performed under slurry conditions, wherein the product consists usually of solid particles and is in suspension in a diluent. The slurry contents of the reactor are circulated continuously with a pump to maintain efficient suspension of the polymer solid particles in the liquid diluent. The diluent does not react but is typically utilized to control solids concentration and also to provide a convenient mechanism for introducing the catalyst into the reactor. Following such polymerization process a polymerization effluent is produced comprising slurry of polymer solids in a liquid that contains diluent, dissolved unreacted monomer, and dissolved unreacted co-monomer. Typically this liquid also includes traces of heavier elements, e.g. oligomers, and lighter components including $H_2$, $N_2$, $O_2$, CO and/or $CO_2$. Catalyst will generally be contained in the polymer.

The product is further discharged to a flash tank, through flash lines, where most of the diluent and unreacted monomers are flashed off. Afterwards, it is highly desirable to further treat the vapors in order to recover the unreacted monomer, unreacted co-monomer and the diluent, since there is an economic interest in re-using these separated components including the monomer, co-monomer, and the diluent, in a polymerization process. Alternatively, the product slurry may be fed to a second loop reactor serially connected to the first loop reactor where a second polymer fraction may be produced. Typically, when two reactors in series are employed in this manner, the resultant polymer product, which comprises a first polymer fraction produced in the first reactor and a second polymer fraction produced in the second reactor, has a bimodal molecular weight distribution.

Slurry polymerization in a loop reaction zone has proven commercially successful. The slurry polymerization technique has enjoyed international success with billions of pounds of polyolefins being so produced annually.

A variety of equipment and operations within a polyolefin manufacturing process may consume energy. Noteworthy consumers of electricity within a polyolefin plant, for example, may include the pumps that circulate the liquid reaction mixture in the polymerization reactors (e.g., loop slurry reactors), the pumps that circulate the cooling medium (e.g., treated water) through the polymerization reactor jackets, the compressors that pressurize and return recycled diluent (and/or monomer) to the polymerization reactor, the blowers used to convey fluff and pellets, and the extruders that convert the polyolefin fluff to polyolefin pellets. Significant users of steam in a typical polyolefin plant may include heaters that flash liquid in the effluent of the polymerization reactor, and fractionation columns that process recovered diluent and/or monomer. Relatively large consumers of fuel gas may include activation processes (which may utilize high heat) of the polymerization catalyst, and operations that maintain adequate combustible content in the plant flare header (in the feed to the flare). In general, extensive energy is required to polymerize the monomer and comonomer to polyolefin fluff, to process recycled effluent from the reactor, and to convert the polyolefin fluff to pellets.

Therefore, the production of polyolefin is an energy-intensive process, consuming electricity, steam, fuel gas, and so on. Such energy consumption generally contributes significant cost to the production of polyolefins, as well as to the downstream products constructed of polyolefins distributed to the customer.

SUMMARY OF THE INVENTION

The present invention is primarily directed to a process for improving the separation of a vaporous hydrocarbon containing stream separated from the effluent from a homo-polymerization and/or co-polymerization process.

In particular, the present invention concerns a process for the separation of a hydrocarbon-containing feed stream (20) comprising the steps of:
a) optionally cooling said hydrocarbon-containing feed stream (20) using an absorption refrigeration cycle (37),
b) introducing said feed stream (20) into a first distillation zone (22) for subjecting said feed (20) to distillation conditions adapted to remove b1) a bottom stream (25) comprising co-monomer, and b2) an overhead stream (29) comprising hydrocarbon diluent, olefin monomer and further components such as $H_2$, $N_2$, $O_2$, CO, $CO_2$, and formaldehyde, and
c) introducing the overhead stream (29) of step b) in a second distillation zone (23) for subjecting said stream (29) to distillation conditions adapted to remove c1) a bottom stream (30) comprising substantially olefin-free hydrocarbon diluent, c2) a side stream (31) comprising hydrocarbon diluent, and c3) an overhead vapor stream (32) comprising olefin monomer, diluent and further (lighter) components such as formaldehyde, $H_2$, $N_2$, $O_2$, CO and $CO_2$, and
d) cooling the temperature of said removed overhead vapor stream (32) of step c3) using an absorption refrigeration cycle (34) prior to separating (35) said olefin monomer from said diluent in said overhead vapor stream (32).

The inventors have surprisingly found that energy efficiency in the production of polyolefin could be increased.

The present invention allows the use of thermal energy produced on an olefin polymerization site, wherein said energy is recycled back to said polymerization site. This invention relates to the efficient energy recovery of the heat produced by reboiler of distillation unit for driving absorption refrigeration cycle used for refrigerating stream removed from said distillation unit in a polyolefin production site.

In an embodiment of said process, the temperature of said overhead vapor stream (32) is cooled to a temperature between 0° C. and −40° C., preferably between −10° C. and −30° C., preferably between −10° C. and −20° C. Preferably, water and ammonia are used as working fluids in said absorption refrigeration cycle (34) of step d).

In another embodiment, said absorption refrigeration cycle (34) of step d) is driven using heat recycled from a reboiler of the first distillation zone (22).

In some embodiments of the foregoing process, the temperature of the side stream (31) of step c2) is also cooled using an absorption refrigeration cycle. Preferably, water and lithium bromide are used as working fluids in the absorption refrigeration cycle of step c2). Alternatively, water and ammonia can be used as working fluids in the absorption refrigeration cycle of step c2).

In some embodiments of the foregoing process, water and lithium bromide are also used as working fluids in the absorption refrigeration cycle of step a).

Some embodiments of the foregoing process, comprise introducing the bottom stream (25) of step b) in a third distillation zone for subjecting said bottom stream (25) to distillation conditions adapted to remove 1) a bottom stream comprising co-monomer and 2) an overhead stream comprising hydrocarbon diluent.

The present invention also concerns a process for the production of polyolefins comprising the steps of
    introducing into a reactor one or more olefin reactants, polymerization catalysts and diluents, and while circulating said reactants, catalysts and diluents,
    polymerizing one or more olefin reactants to produce a polymer slurry comprising essentially liquid diluent and solid olefin polymer particles,
    recovering olefin polymer particles from the slurry by separating at least a majority of the diluent from the slurry in a hydrocarbon-containing feed stream,
    distilling and separating said hydrocarbon-containing feed stream according to a process of separation as presently claimed.

In an embodiment said distillation is optimized using a process as described herein.

The present invention also concerns the use of a separation process according to the present invention in a polyolefin production process, comprising the steps of
    introducing into a reactor one or more olefin reactants, polymerization catalysts and diluents, and while circulating said reactants, catalysts and diluents,
    polymerizing one or more olefin reactants to produce a polymer slurry comprising essentially liquid diluent and solid olefin polymer particles, and
    recovering olefin polymer particles from the slurry by separating at least a majority of the diluent from the slurry in a hydrocarbon-containing feed stream (20), and
separating said hydrocarbon-containing feed stream (20) using a separation process as described herein.

In another aspect, the present invention also concerns a polyolefin producing unit, comprising
    means for feeding monomer, a co-monomer, diluent, a polymerization catalyst and optionally hydrogen to at least one polymerization reactor;
    a reactor system comprising at least one polymerization reactor defining a flow path for a polymer slurry,
    one or more diluent/monomer recovery system configured to separate a majority of the diluent from the slurry discharged from the polymerization reactor;
    one or more fractionation system configured to process a portion of the diluent discharged from the diluent/monomer recovery system and to provide recovered diluent substantially free of olefin monomer; and
    a polyolefin processing system configured to process polyolefin particles recovered from the slurry in the diluent/monomer recovery system,
wherein said one or more fractionation system is coupled with one or more absorption refrigeration unit.

The present invention provides a process that allows the optimizing a distillation process in a polyolefin production plant, comprising the steps of recovering an overhead vapor stream from a distillation unit and cooling the temperature of said overhead vapor stream using an absorption refrigeration cycle thereby optimizing the distillation process.

The present invention allows reducing energy consumption in a polyolefin production process and an increase of the hydrocarbon recovery. The present invention improves plant efficiency and permits to recover wasted energy resources.

The present invention will be further disclosed in detail hereunder. The description is only given by way of example and does not limit the invention. The reference numbers relate to the hereto-annexed figures.

DETAILED DESCRIPTION

Figure 1A:
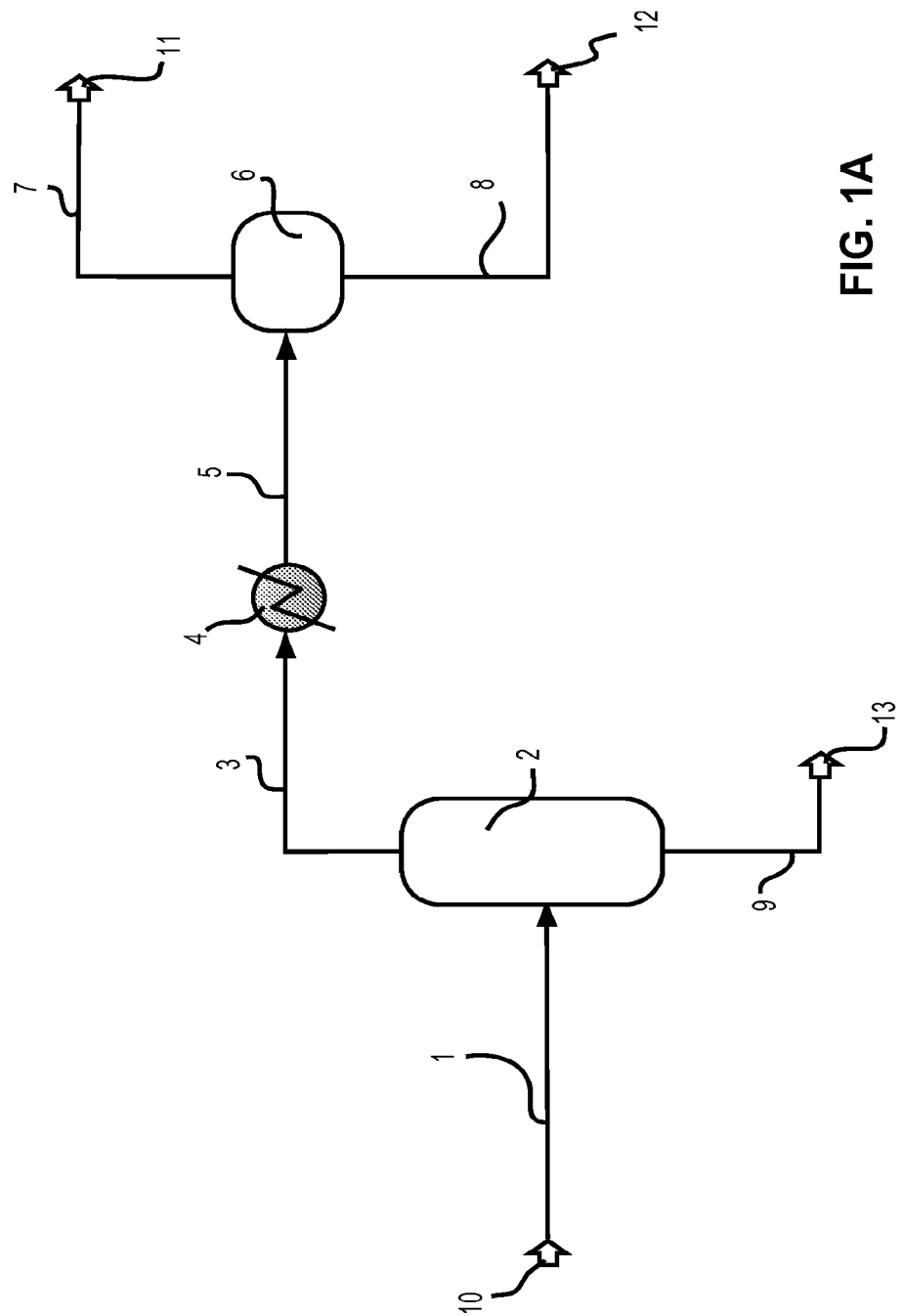
FIG. 1A schematically represents a separation unit comprising a separation column coupled with an absorption refrigeration unit according to an embodiment of the present invention.

The invention provides a system for energy valuation in a separation process of a vaporous hydrocarbon stream, wherein at least one absorption refrigeration cycle is thermally coupled to the separation process of said vaporous hydrocarbon stream. In a preferred example, such vaporous hydrocarbon stream may be issued from the effluent of a polymerization process, in particular for the polymerization of ethylene. Advantageously, application of the present separation process includes the benefits of less energy usage.

The present invention concerns a process for the separation of a hydrocarbon-containing feed stream comprising olefin monomer, co-monomer and hydrocarbon diluent, comprising the steps of: distilling said hydrocarbon-containing feed stream, removing a bottom stream comprising substantially olefin-free hydrocarbon diluent, optionally removing a side stream comprising hydrocarbon diluent, removing an overhead vapor stream comprising olefin monomer and diluent, and cooling the temperature of said removed overhead vapor stream using an absorption refrigeration cycle prior to separating said olefin monomer and diluent in said vapor stream.

Cooling this stream minimizes the diluent in this stream, and maximizes diluent recovery.

In another aspect, the present invention concerns a process for optimizing the separation of a hydrocarbon-containing feed stream comprising olefin monomer, co-monomer and hydrocarbon diluent, comprising: distilling said hydrocarbon-containing feed stream, removing a bottom stream comprising substantially olefin-free hydrocarbon diluent, optionally removing a side stream comprising hydrocarbon diluent, and removing an overhead vapor stream comprising olefin monomer and diluent from said distillation step, wherein the optimization comprises cooling the temperature of said hydrocarbon-containing feed stream, using an absorption refrigeration cycle prior to said distillation.

In this embodiment, the hydrocarbon-containing feed stream is cooled before the compressor, upstream of the distillation section. Cooling before the compressor allows a downsizing of the compressor and reduces the electrical consumption.

The present processes allow the optimization of the separation of an overhead vapor stream comprising olefin monomer and diluent, wherein the process comprises the steps of distilling a hydrocarbon-containing feed stream and removing the overhead vapor stream comprising olefin monomer and diluent from said distillation, wherein the optimization comprises cooling the temperature of said removed overhead vapor stream using an absorption refrigeration cycle thereby optimizing the separation of said monomer from said diluent.

In another aspect, the present invention concerns a polyolefin production process, comprising the steps of
  introducing into a reactor one or more olefin reactants, polymerization catalysts and diluents, and while circulating said reactants, catalysts and diluents,
  polymerizing one or more olefin reactants to produce a polymer slurry comprising essentially liquid diluent and solid olefin polymer particles,
  recovering olefin polymer particles from the slurry by separating at least a majority of the diluent from the slurry in a hydrocarbon-containing feed stream,
  distilling said hydrocarbon-containing feed stream,
  removing an overhead vapor stream comprising olefin monomer and diluent from said distillation step, and
  cooling the temperature of said removed overhead vapor stream using an absorption refrigeration cycle prior to separating said olefin monomer and diluent in said removed vapor stream.

Preferably, said process comprises the steps of cooling the temperature of said hydrocarbon-containing feed stream, using an absorption refrigeration cycle prior to said distillation. In an embodiment, said removed overhead vapor stream is further distilled, and a second overhead vapor is removed from said second distillation prior to cooling said second overhead vapor stream.

The present invention therefore provides a process for optimizing the separation of an overhead vapor stream comprising olefin monomer and diluent, wherein an hydrocarbon-containing feed stream is distilled and said overhead vapor stream comprising olefin monomer and diluent is removed from said distillation step, wherein the optimization consists in cooling the temperature of said removed overhead vapor stream using an absorption refrigeration cycle thereby optimizing the separation of said monomer from said diluent. In an embodiment, said removed overhead vapor stream is further distilled, and a second overhead vapor is removed from said second distillation prior to cooling said second overhead vapor stream using said absorption refrigeration unit.

In an embodiment, said process comprises cooling the temperature of said overhead vapor stream between 0° C. and −40° C., preferably between −10° C. and −30° C., more preferably between −10° C. and −25° C., yet more preferably between −10° C. and −20° C., more preferably at about −20° C.

In an embodiment, said absorption refrigeration cycle is driven using heat recycled from a reboiler of a distillation column. In an embodiment, said boiler is the boiler of a first distillation column.

According to a particular embodiment, at least one absorption refrigeration cycle is in thermal contact with the overhead vapor stream removed from a separation column. The absorption refrigeration unit typically comprises one or more cooling circuits, each comprising a generator, a condenser and an evaporator, in association with an expansion valve.

The hydrocarbon-containing feed stream that is to be separated according to the present invention in such distillation system will generally be an overhead stream coming from a flash tank and purge columns of a polymerization reactor, wherein a stream containing solvent, polymer and unreacted monomers is flashed or otherwise treated to remove solvent or diluent and monomers there from. In an embodiment, said flashed or treated feed stream is cooled using at least one absorption refrigeration unit prior to said distillation. In an embodiment, said hydrocarbon-containing feed stream is cooled using two absorption refrigeration units.

A presently preferred component stream separated according to the invention comprises monomer, such as ethylene, co-monomer, such as 1-hexene, and diluent, such as isobutane. It should be recognized however, that the distillation system of the invention is equally applicable to other monomer, co-monomer and diluent systems so long as feed vapors comprise hydrocarbons, which permit separation by distillation. Traces of both heavier, e.g. oligomers, and lighter components such as formaldehyde, $N_2$, $H_2$, and components such as $O_2$, CO and $CO_2$ are generally also present in such effluent streams.

In another embodiment said hydrocarbon-containing feed stream can be an overhead stream coming from a first distillation column.

A typical absorption refrigeration cycle uses at least two substances: ammonia and water is a typical pair of working fluids, but other pairs of working fluids can be used. As used herein, the term "working fluid" refers to the medium evolving within a thermodynamic cycle.

In an embodiment, the absorption refrigeration unit cools the overhead vapor stream removed from a distillation column by evaporating liquid ammonia in an optional hydrogen environment. The now-gaseous ammonia is then absorbed (dissolved) into water, and then later separated (boiled off from the water) by a small source of heat (in the form of steam or hot water from the distillation column reboiler). This drives off the dissolved ammonia gas which is then condensed into a liquid. The liquid ammonia then enters the evaporator to repeat the cycle.

Suitable working fluids for said absorption refrigeration cycle besides the preferred water and ammonia mixture include a circulating material that undergoes a phase change to promote the absorption and release of heat energy such as for example a solution of lithium bromide salt and water. Water is evaporated under low pressure from the coils that are being chilled. The water is absorbed by a lithium bromide/water solution. The water is driven off the lithium bromide solution using heat.

In a preferred embodiment, the absorption refrigeration unit for use in the invention uses substances: ammonia, and water and optionally hydrogen gas. The cooling cycle starts in an evaporator, where liquefied anhydrous ammonia enters. The evaporator may contain another gas (preferably hydrogen), which presence may help lowering the partial pressure of the ammonia in that part of the system. The lowered partial pressure of ammonia changes the ammonia's boiling point, bringing it low enough that it can boil below room temperature. The overhead vapor stream in thermal contact with said ammonia is cooled in said evaporation upon boiling of said ammonia.

Said ammonia is then sent to an absorber comprising a downhill flow of tubes in which the mixture of gases flows in contact with water being dripped from above. Once the water reaches the bottom, it is thoroughly mixed with the ammonia, and the hydrogen can flow freely back to the evaporator. Hot water or steam from the distillation column reboiler is used for separating ammonia from water in the generator. Ammonia gas is then conveyed in a separator where it is dried and the water is recycled back through the previous absorption step. The next step is the condenser where the hot ammonia gas is cooled back down to room temperature. Because of the pressure, the ammonia condenses back into a liquid and the cycle starts over again.

One of the advantages of using an absorption refrigeration unit at this stage of the feed recycling process is that said absorption refrigeration unit utilizes a heat source available in the vicinity of the unit (a reboiler for distillation column) to provide the energy needed to drive the cooling system rather than being dependent on electricity to run a compressor.

In another aspect, the present invention provides a process for the separation of a hydrocarbon-containing feed stream comprising olefin monomer, co-monomer and hydrocarbon diluent, comprising the steps of: distilling said hydrocarbon-containing feed stream, removing a bottom stream comprising substantially olefin-free hydrocarbon diluent, optionally removing a side stream comprising hydrocarbon diluent, removing an overhead vapor stream comprising olefin monomer and diluent, and cooling the temperature of said removed overhead vapor stream using an absorption refrigeration cycle prior to separating said olefin monomer and diluent in overhead said vapor stream. In an embodiment, the temperature of said removed overhead vapor stream is cooled between 0° C. and −40° C., preferably between −10° C. and −30° C., more preferably between −10° C. and −25° C., yet more preferably between −10° C. and −20° C., more preferably at about −20° C.

The advantage of the whole process is that said absorption refrigeration cycle is driven using heat recycled from a reboiler of a distillation column.

In an embodiment, said hydrocarbon-containing feed stream comprising olefin monomer, co-monomer and hydrocarbon diluent, is an overhead vapor stream removed from a first distillation column.

In an embodiment, the temperature of said hydrocarbon-containing feed stream comprising olefin monomer, co-monomer and hydrocarbon diluent, is cooled using an absorption refrigeration cycle. In particular, said cooling is performed prior to compressing said hydrocarbon-containing feed stream. In a preferred embodiment said hydrocarbon-containing feed stream is cooled using a first refrigeration cycle, said cooled hydrocarbon-containing feed stream is then compressed and further cooled using a second refrigeration cycle before being further compressed. In an embodiment, water and lithium bromide are used as working fluids in said absorption refrigeration cycle.

In an embodiment, the temperature of said removed side stream is cooled using an absorption refrigeration cycle. In particular, said cooling is performed prior to compressing said removed side stream. In an embodiment, water and lithium bromide are used as working fluids in said absorption refrigeration cycle.

In a further aspect, the present invention provides a process for optimizing the separation of a hydrocarbon-containing feed stream comprising olefin monomer, co-monomer and hydrocarbon diluent, comprising: distilling said hydrocarbon-containing feed stream, removing a bottom stream comprising substantially olefin-free hydrocarbon diluent, optionally removing a side stream comprising hydrocarbon diluent, and removing an overhead vapor stream comprising olefin monomer and diluent, wherein the optimization consists in cooling the temperature of said hydrocarbon-containing feed stream using an absorption refrigeration cycle prior to said distillation.

In an embodiment, water and lithium bromide are used as working fluids in said absorption refrigeration cycle. In particular, said cooling is performed prior to compressing said hydrocarbon-containing feed stream. In a preferred embodiment said hydrocarbon-containing feed stream is cooled using a first refrigeration cycle, said cooled hydrocarbon-containing feed stream is then compressed and further cooled using a second refrigeration cycle before being further compressed and before being distilled.

In an embodiment, the removed overhead vapor stream is cooled using an absorption refrigeration cycle.

In another embodiment, the removed overhead vapor stream is further distilled in a second distillation unit and a second overhead vapor stream is further removed from said second distillation step. In an embodiment, the second removed overhead vapor stream is cooled using an absorption refrigeration cycle. Preferably, water and ammonia are used as working fluid for the cooling of said overhead vapor stream.

The advantage of the process is that said absorption refrigeration cycle is driven using heat recycled from a reboiler of a distillation column, for example of said first distillation column.

The present invention is applicable to any process producing an effluent comprising a slurry of particulate polymer solids suspended in a liquid medium comprising a diluent and unreacted monomer. Such reaction processes include those which have come to be known in the art as particle form polymerizations.

More in particular, the present invention relates to a separation process of a hydrocarbon-containing feed, wherein said hydrocarbon-containing feed stream comprising olefin monomer, co-monomer and hydrocarbon diluent is an effluent stream obtained from a polymerization process for preparing polyethylene, and preferably for preparing monomodal or bimodal polyethylene. Ethylene polymerizes in a liquid diluent in the presence of a catalyst, optionally a co-catalyst, optionally a co-monomer, optionally hydrogen and optionally other additives, thereby producing polymerization slurry. In a preferred embodiment, present invention is particularly suitable for the polymerization of ethylene in isobutane diluent.

Suitable ethylene polymerization includes but is not limited to homopolymerization of ethylene, copolymerization of ethylene and a higher 1-olefin co-monomer such as 1-butene, 1-pentene, 1-hexene, 1-octene or 1-decene. In an embodiment of the present invention, said co-monomer is 1-hexene. In a preferred embodiment, the present invention is directed to the separation process of a vaporous stream, which is issued from the effluent of an ethylene polymerization reaction wherein reactants including the monomer ethylene, isobutane as hydrocarbon diluent, a catalyst, the co-monomer 1-hexene and hydrogen are used. However, it will be appreciated that the present processes are applicable to separate a vaporous stream, which is issued from the effluent of any other polymerization reaction involving other monomer, co-monomer and diluent systems as long as the feed vapors comprise hydrocarbons which permit separation by distillation.

More in particular, the present invention relates to a separation process of a hydrocarbon-containing feed, wherein said hydrocarbon-containing feed stream comprising olefin monomer, co-monomer and hydrocarbon diluent is an effluent stream obtained from a polymerization process for preparing polyethylene, and preferably for preparing monomodal or bimodal polyethylene. Preferably, separated monomer, hydrocarbon diluent and co-monomer are re-used in said polymerization process. "Bimodal PE" refers to PE that is manufactured using two reactors, which are connected to each other in series, the operating conditions being different in the two reactors. "Monomodal PE" is produced in a single reactor or using two reactors in series, with identical operating conditions.

As used herein, the term "polymerization slurry" or "polymer slurry" or "slurry" means substantially a multi-phase composition including at least polymer solids and a liquid phase and allows for a third phase (gas) to be at least locally present in the process, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

Preferably, separated monomer, hydrocarbon diluent and co-monomer are re-used in said polymerization process.

The present invention is particularly suitable for polymerization process for the manufacture of particulate olefin polymers consisting of the catalytic polymerization of olefins such as $C_2$ to $C_8$ olefins in a diluent containing the monomer to be polymerized, the polymerization slurry being circulated in a loop reactor to which the starting material is fed and from which the polymer formed is removed. Examples of suitable monomers include but are not limited to those having 2 to 8 carbon atoms per molecule, such as ethylene, propylene, butylene, pentene, butadiene, isoprene, 1-hexene and the like.

The polymerization reaction can be carried out at a temperature of from 50 to 120° C., preferably at temperature of from 70 to 115° C., more preferably at temperature of from 80 to 110° C., and at a pressure of from 20 to 100 bar, preferably at pressure of from 30 to 50 bar, more preferably at pressure of 37 to 45 bar.

Suitable diluents are well known in the art and include but are not limited to hydrocarbon diluents such as aliphatic, cycloaliphatic and aromatic hydrocarbon solvents. The preferred solvents are $C_{12}$ or lower, straight chain or branched chain, saturated hydrocarbons, $C_5$ to $C_9$ saturated alicyclic or aromatic hydrocarbons. No limiting illustrative examples of solvents are butane, isobutane, pentane, hexane, heptane, cyclopentane, cyclohexane, cycloheptane, methyl cyclopentane, methyl cyclohexane, isooctane, benzene, toluene, and xylene. In a preferred embodiment of the present invention, said diluent is isobutane. However, it should be clear from the present invention that other diluents may as well be applied according to the present invention.

Suitable catalysts are well known in the art. According to the present invention, the term "catalyst" is defined herein as a substance that causes a change in the rate of a co-polymerization reaction without itself being consumed in the reaction. Examples of suitable catalysts include but are not limited to chromium oxide such as those supported on silica or aluminum, organometal catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization reaction.

The terms "distillation system" or "separation system", "recovery system", are used in some embodiment of the present invention as synonyms and refer to systems comprising all necessary equipment adapted to separate and recover unreacted reactants form the effluent stream of a polymerization reaction. Such recovery systems generally include one or more distillation columns. The term "distillation zone", "separation column" and "distillation column" may be used herein as synonyms. In a preferred embodiment, the present distillation process is carried out in a distillation system, which comprises one or more distillation zones or columns.

In a preferred embodiment, one or more of said distillation columns are tray columns. Such tray columns comprise a number of trays of various designs to hold up the liquid in order to provide better contact between vapor and liquid. Trays essentially act as a unit operation, each accomplishing a fraction of the separation between liquid and gas. It is clear that the more trays there are, the better the degree of separation, and thus the better column performance will be. However, using a large number of trays in distillation columns has important disadvantages, especially with regard to construction. Suitable distillation systems comprise distillation system having column(s) with a low number of trays, preferably lower than 25, even more preferred lower than 20. Nevertheless, although distillation columns with a low number of trays can be used in the present process, improvements on the operation of the present distillation systems, as explained into more detail below, permit to achieve a similar degree of separation as for columns with a higher number of trays. Advantageously, application of the present process includes the benefits of less energy usage and lower construction costs.

In an alternative embodiment, one or more of said distillation columns are divided wall distillation column or divided wall column. Such column is a distillation vessel having a vertical partition separating one side from the other for a portion or all of the height of the vessel. Although such column comprises a larger number of trays, the use of such single column may be advantageous with regard to construction costs and energetic requirements.

In a preferred embodiment, one or more of said distillation columns are packing columns. Packing column refers to column packed with inert solid particles.

Reboilers are used as heat exchangers to provide heat to the bottom of said distillation columns. They boil the liquid from the bottom of a distillation column to generate vapors which are returned to the column to drive the distillation separation. The reboiler receives a liquid stream from the column bottom and may partially or completely vaporize that stream. Steam usually provides the heat required for the vaporization. In an embodiment of the present invention, the hot condensates from said reboiler are used for driving the absorption refrigeration unit for use in the present invention.

This process allows recycling energy from the water condensates from said reboiler by using said energy for driving an absorption refrigeration cycle.

Following a polymerization process, polymer effluent is generally separated from the liquid by flash vaporization. According to the invention, the hereby obtained vaporous feed stream, comprising monomer, such as ethylene, co-monomer, such as 1-hexene, and diluent, such as isobutane, is subsequently separated into individual monomer, co-monomer and diluent streams in a separation system comprising one or more distillation zones.

Separate streams of monomer, co-monomer and diluent are recovered for further use, e.g. use in the polymerization reaction. The vaporous feed stream, coming from the flash tanks also comprises traces of both heavier, e.g. oligomers, and lighter components including $N_2$, $H_2$, and light poisonous components such as $O_2$, CO and $CO_2$, and formaldehyde. Such components are herein also denoted as "poisonous components", because such components are detrimental for the activity of a catalyst. Re-introduction thereof into a polymerization reactor could greatly disturb catalyst activity and thus reduce polymerization efficiency. It is therefore of the utmost importance to have a recovery system adapted to recover essentially pure streams of (co-)monomer, and diluent, without substantial residual amount of such poisonous components for re-use in a polymerization process.

In general, the distillation zone is used for the separation of 3 main components, comonomer, diluent, and monomer. The major component is the diluent, with a part of 90-95 wt % of the feed stream of the distillation section.

In a first column splits all components heavier than the diluent (in bottom), the top of the column (overhead stream) is sent to a second column. In an embodiment, the top of the column (i.e. the overhead stream) can be chilled using an absorption refrigeration unit.

The second column removes from the diluent lighter components, in order to get pure diluent. In an embodiment, the top of the column (i.e. the overhead stream) can be chilled using an absorption refrigeration unit.

The heavy end and light end can be optionally treated in other columns depending on the requests. These two streams represent less than 10% of the column feed.

According to an embodiment of the present process the feed stream is passed to a distillation column and subjected to distillation conditions adapted to remove a bottom stream comprising substantially olefin-free hydrocarbon diluent, optionally a side stream comprising hydrocarbon diluent, and an overhead vapor stream comprising olefin monomer, diluent and further components such as $H_2$, $N_2$, $O_2$, CO, $CO_2$ and formaldehyde.

The bottom stream comprises substantially olefin-free hydrocarbon diluent. The term "substantially olefin-free hydrocarbon diluent" or "olefin-free diluent" or the like are used herein as synonyms to denote hydrocarbon diluent which contains less than 5000 ppm, and preferably less than 1000 ppm, and even more preferred less than 100 ppm of monomer and/or co-monomer. Substantially free of traces of monomer such as ethylene and/or co-monomer such as hexene, the bottom stream of olefin free hydrocarbon diluent, such as isobutane, issued from the distillation column can be sent to a storage tank and further used, e.g. for flushing conduits and circulation pumps in a polymerization reactor, or for catalyst preparation e.g. in mud pots. This olefin-free diluent can be recycled to a polymerization zone, whether homo-polymerization or co-polymerization, at any place of the process where pure diluent is requested, like the catalyst dilution.

The side stream of hydrocarbon diluent issued from the distillation column is generally sent to a storage tank and further used. Preferably, the amount of further components such as $H_2$, $N_2$, $O_2$, CO and $CO_2$, formaldehyde in the side stream is lower than 10 ppm, and preferably lower than 1 ppm, and even more preferred lower than 0.5 ppm. In another preferred embodiment, the amounts of monomer and/or co-monomer remaining in the side stream are lower than 25% and preferably lower than 10% and even more preferred lower than 5%. High amounts of monomer in the storage tank of the side-stream product may lead to evaporation and substantial monomer loss. By keeping the amount of monomer in the side-stream product below 25% and preferably below 10%, or even below 5%, evaporation of monomer from the storage tank can be reduced and storage of the side-stream product at atmospheric conditions becomes possible. The hydrocarbon diluent issued from the side stream exiting from the distillation zone is generally used as diluent in a polymerization reactor, either homo-polymerization or co-polymerization depending upon monomers being subjected to polymerization. It is in particular very suitable for use as diluent especially in a second polymerization reactor when polymerizing under bimodal operation, or in a first as well as a second reactor, when polymerizing under monomodal operation.

Light components such as formaldehyde, $H_2$, $N_2$, $O_2$, CO and $CO_2$ exit the distillation zone with some residual monomer and diluent as an overhead vapor stream. According to an embodiment of the present invention said overhead vapor stream is cooled below 0° C., preferably below −10° C., more preferably between −10° C. and −25° C., yet more preferably between −10° C. and −20° C., more preferably at about −20° C. using an absorption refrigeration cycle driven by the heat from the reboiler water condensates. In particular the overhead vapor stream is transferred to a vent condenser which is chilled using an absorption refrigeration unit. After chilling in the vent condenser partial condensation takes places, liquid is sent back to the column (it is the reflux) and the gas is sent to the Ethylene Recovery Unit (ERU). These light components are then further treated in the Ethylene Recovery Unit, which further separates the light components from the remaining monomer and hydrocarbon diluent.

The vent condenser is a chilling allowing the separation of the components from the overhead vapor stream, which chilling has been performed using the absorption refrigeration unit. The separation is performed at temperatures preferably below 0° C., preferably between 0° C. and −60° C., preferably between −10° C. and −30° C., more preferably between −10° C. and −25° C., yet more preferably between −10° C. and −20° C., more preferably at about −20° C. This separation allows the condensation and the recovery of the maximum isobutane and minimizes the quantity of isobutane which are conveyed to the ERU (ethylene recovery unit). This is achieved according to an embodiment of the present invention by chilling the stream sent to the ERU using an absorption refrigeration cycle.

Under prior art conditions, the stream conveyed to the ERU comprised isobutane, ethylene, hydrogen, nitrogen and ethane. Ethylene and isobutane were further recovered in ERU. Using the process of the invention allows reducing the amount of isobutane sent to the ERU, since it is almost completely recovered in the vent condenser chilled by the absorption refrigeration unit.

Preferably, the amount of remaining diluent that is sent to the ERU is lower than 30%, preferably lower than 20%, preferably lower than 10%, preferably lower than 5% and more preferably lower than 1%. Preferably, the amount of remaining monomer sent to the ERU is also lower than 50%. Monomer and diluent that are recovered by means of the ERU unit are preferably re-used in the polymerization process.

In one embodiment, the present process is carried out in a distillation system, which comprises one distillation zone or column. Preferably said column may comprise a divided wall distillation column or divided wall column. In such case, the invention provides for a process for optimizing the separation of a hydrocarbon-containing feed stream comprising the steps of:
a) optionally cooling said hydrocarbon-containing feed using an absorption refrigeration cycle,
b) passing said feed to a distillation zone for subjecting said feed to distillation conditions adapted to remove b1) a bottom stream comprising co-monomer and hydrocarbon diluent, and b2) an overhead vapor stream comprising hydrocarbon diluent, olefin monomer and further components such as $H_2$, $N_2$, $O_2$, CO, $CO_2$, and formaldehyde, and
c) cooling the temperature of said removed overhead vapor stream using an absorption refrigeration cycle prior to separating said olefin monomer and diluent in overhead said vapor stream.

In another embodiment, the present process is carried out in a distillation system, which comprises at least two distillation zones or columns. In such case, the invention provides for a process for optimizing the separation of a hydrocarbon-containing feed stream comprising the steps of:
a) optionally cooling said hydrocarbon-containing feed stream using an absorption refrigeration cycle,
b) passing said feed stream to a first distillation zone for subjecting said feed to distillation conditions adapted to remove b1) a bottom stream comprising co-monomer, and b2) an overhead stream comprising hydrocarbon diluent, olefin monomer and further components such as $H_2$, $N_2$, $O_2$, CO, $CO_2$, and formaldehyde, and
c) introducing the overhead stream of step b) in a second distillation zone for subjecting said stream to distillation conditions adapted to remove c1) a bottom stream comprising substantially olefin-free hydrocarbon diluent, c2) a side stream comprising hydrocarbon diluent, and c3) an overhead vapor stream comprising olefin monomer, diluent and further components such as formaldehyde, $H_2$, $N_2$, $O_2$, CO and $CO_2$, and
d) cooling the temperature of said removed overhead vapor stream using an absorption refrigeration cycle prior to separating said olefin monomer and diluent in said overhead vapor stream.

In yet another embodiment, the present process is carried out in a distillation system, which comprises three distillation zones or columns. In such case, the invention provides for a process for optimizing the separation of a hydrocarbon-containing feed stream comprising the steps of:
a) optionally cooling said hydrocarbon-containing feed stream using an absorption refrigeration cycle,
b) passing said feed stream to a first distillation zone for subjecting said feed to distillation conditions adapted to remove b1) a bottom stream comprising co-monomer and hydrocarbon diluent and b2) an overhead stream comprising hydrocarbon diluent, olefin monomer and further components such as $H_2$, $N_2$, $O_2$, CO, $CO_2$ and formaldehyde,
c) introducing the bottom stream of step b) in a second distillation zone for subjecting said stream to distillation conditions adapted to remove c1) a bottom stream comprising co-monomer and c2) an overhead stream comprising hydrocarbon diluent,
d) introducing the overhead stream of step b) in a third distillation zone for subjecting said stream to distillation conditions adapted to remove d1) a bottom stream comprising substantially olefin-free hydrocarbon diluent, d2) a side stream comprising hydrocarbon diluent, and d3) an overhead vapor stream comprising olefin monomer, diluent, and further components such as formaldehyde, $H_2$, $N_2$, $O_2$, CO and $CO_2$, and
d) cooling the temperature of said removed overhead vapor stream of step (c) using an absorption refrigeration cycle prior to separating said olefin monomer and diluent in said overhead vapor stream.

The hydrocarbon diluent obtained in stream c2) may be returned to the first distillation zone.

The above-described processes according to the present invention can be further adapted.

Said adaptation may consists in maximizing the overhead stream (e.g. c3) or d3)) obtained from the distillation column by adapting the ratio of the bottom stream flow removed from the distillation column to the feed stream flow introduced in the distillation column. In an embodiment, said ratio is lower than or equal to 1.0, and preferably comprised between 0.3 and 1.0, and more preferably between 0.4 and 0.95, and may for instance comprise 0.4, 0.5, 0.6, 0.7, 0.8 or 0.9. The ratio set point of bottom stream flow rate to feed stream flow rate which is suitable according to the present process can be adjusted manually or automatically, to ensure enough olefin free diluent product and suitable venting to the ERU to remove light components. The ratio can be adapted by adapting the reflux to the distillation column.

Said adaptation may also consist in adding the side stream obtained in the distillation column with the bottom stream obtained in the distillation column. Generally, the bottom stream of olefin free hydrocarbon diluent issued from the distillation column, and the side stream of hydrocarbon diluent are both sent to separate storage tanks. Diluting the side stream with the bottom stream permits to control the level of product in the storage tanks for the side-stream product and for the bottom-stream product. Diluting the side stream with the bottom stream is further required in view of controlling the ratio of the bottom stream flow to the feed stream flow.

Other improvements to the operation of the distillation column include improvements for stabilizing the distillation conditions in the distillation column.

For that, a further step can be provided of re-boiling a portion of the bottom stream obtained in the distillation column under controlled steam flow rate and returning said re-boiled portion to the distillation column.

The rate of the steam flow can be controlled as a function of the temperature in the distillation column. Preferably, the steam flow rate is controlled as a function of the temperature on a tray located in the lower half of the column, i.e. equal to or lower than ½ of the height of the column, and even more preferred located in the lower quarter of the column, i.e. equal to or lower than ¼ of the height of the column.

Preferably, this temperature is used as an input parameter in a temperature controller system driving and controlling the reboiler steam flow rate. In addition, in order to make the control system as insensitive as possible to pressure variations in the distillation zone, the controller parameters have been chosen so as to obtain a relatively slow reaction of the controller system. In addition, the sump level of the distillation column can be adapted to the bottom stream flow by means of a level controller.

In another aspect, the present invention also provides a polyolefin production process, comprising the steps of: introducing into a reactor one or more olefin reactants, polymerization catalysts and diluents, and while circulating said reactants, catalysts and diluents, polymerizing one or more olefin reactants to produce a polymer slurry comprising essentially liquid diluent and solid olefin polymer particles, recovering olefin polymer particles from the slurry by separating at least a majority of the diluent from the slurry in a hydrocarbon-containing feed stream, separating said hydrocarbon-containing feed stream, removing at least one stream from said separation step, and cooling the temperature of said removed stream using an absorption refrigeration cycle.

In one embodiment, said removed stream is an overhead vapor stream removed from a distillation step, said stream comprising olefin monomer and diluent. In another embodiment, said removed stream is a side stream comprising hydrocarbon diluent removed from a distillation step. In another embodiment, both said overhead vapor stream and said side stream are refrigerated using at least two absorption refrigeration units.

In another embodiment, the temperature of the hydrocarbon-containing feed stream is cooled using at least one absorption refrigeration cycle.

In an embodiment, the present invention also provides a polyolefin production process, comprising the steps of: introducing into a reactor one or more olefin reactants, polymerization catalysts and diluents, and while circulating said reactants, catalysts and diluents, polymerizing one or more olefin reactants to produce a polymer slurry comprising essentially liquid diluent and solid olefin polymer particles, recovering olefin polymer particles from the slurry by separating at least a majority of the diluent from the slurry in a hydrocarbon-containing feed stream, separating said hydrocarbon-containing feed stream, removing an overhead vapor stream from said separation step, and cooling the temperature of said removed overhead vapor stream using an absorption refrigeration cycle prior to separating said olefin monomer and diluent in said removed vapor stream.

The invention also provides a system for cooling an overhead vapor stream removed from a distillation column using an absorption refrigeration unit. Said absorption refrigeration unit is used to remove thermal energy from said overhead vapor stream and phase conversion of a working fluid is used in the heat removal process.

The present invention also provides one or more diluent/monomer recovery system configured to separate a majority of the diluent from the slurry discharged from the polymerization reactor; said system comprising
one or more fractionation system configured to process a portion of the diluent discharged from the diluent/monomer recovery system and to provide recovered diluent substantially free of olefin monomer; wherein said one or more fractionation system is coupled with one or more absorption refrigeration unit.

In a preferred embodiment, said polyolefin producing unit, comprises:

means for feeding monomer, a co-monomer, diluent and optionally hydrogen to at least one polymerization reactor;
means for feeding a polymerization catalyst in said at least one polymerization reactor,
a reactor system comprising at least one polymerization reactor defining a flow path for a polymer slurry, said slurry consisting essentially of at least one monomer, a co-monomer, a polymerization catalyst, liquid diluent and solid olefin co-polymer particles,
one or more lines for discharging said polymer slurry out of said polymerization reactor,
one or more diluent/monomer recovery system configured to separate a majority of the diluent from the slurry discharged from the polymerization reactor;
one or more fractionation system configured to process a portion of the diluent discharged from the diluent/monomer recovery system and to provide recovered diluent substantially free of olefin monomer; and
an extrusion/loadout system having an extruder/pelletizer configured to extrude and pelletize polyolefin particles recovered from the slurry in the diluent/monomer recovery system,
wherein said one or more fractionation system is coupled with one or more absorption refrigeration unit.

A recycling unit according to an embodiment of the invention is schematically illustrated in FIG. 1A. Said recycling unit comprises a distillation column 2, whose overhead vapor line is in thermal communication with an absorption refrigeration unit 4. Said overhead vapor line is further in communication with a separator 6. The hydrocarbon-containing feed stream 1 that is to be separated will generally be an overhead stream coming from a flash tank and purge columns of a polymerization reactor, wherein a stream containing solvent (solvent=diluent), polymer and unreacted monomers is flashed or otherwise treated to remove solvent or diluent and monomers there from. A presently preferred component stream separated according to the invention comprises monomer, such as ethylene, co-monomer, such as 1-hexene, and diluent, such as isobutane. It should be recognized however, that the distillation system of the invention is equally applicable to other monomer, co-monomer and diluent systems so long as feed vapors comprise hydrocarbons, which permit separation by distillation. Traces of both heavier, e.g. oligomers, and lighter components such as formaldehyde, $N_2$, $H_2$, and components such as $O_2$, $CO$ and $CO_2$ are generally also present in such effluent streams. The hydrocarbon-containing feed stream 1 is fed to said distillation column 2. A bottom stream 9 comprising comonomer and hydrocarbon diluent is removed from said distillation column 2 and further recovered 13. In an embodiment, said hydrocarbon-containing feed stream 1 is an overhead vapor stream removed from a first distillation zone 10, and the bottom stream 9 comprises substantially olefin-free hydrocarbon diluent. An overhead vapor stream 3 comprising olefin monomers and diluent is removed from said distillation column 2 and cooled in a condenser (not shown) by an absorption refrigeration unit 4. In an embodiment, the overhead vapor stream 3 enters the condenser chilled by the absorption refrigeration unit 4 at for example about 28° C. and is cooled to temperature below 0° C. preferably, between −10° C. and −30° C. The cooled overhead vapor stream 5 is then sent to the vent condenser 6 where the ethylene and liquid isobutane 8 are recovered 12, while the overhead vapor stream 7 from the condenser 6 are sent to the ERU 11. The reboiler of the column 2 (not shown) can be thermally connected to the absorption refrigeration unit 4, providing the heat to drive said refrigeration unit 4. The absorption refrigeration unit 4 can also be powered by an alternative hot source (not shown).

Figure 1B:
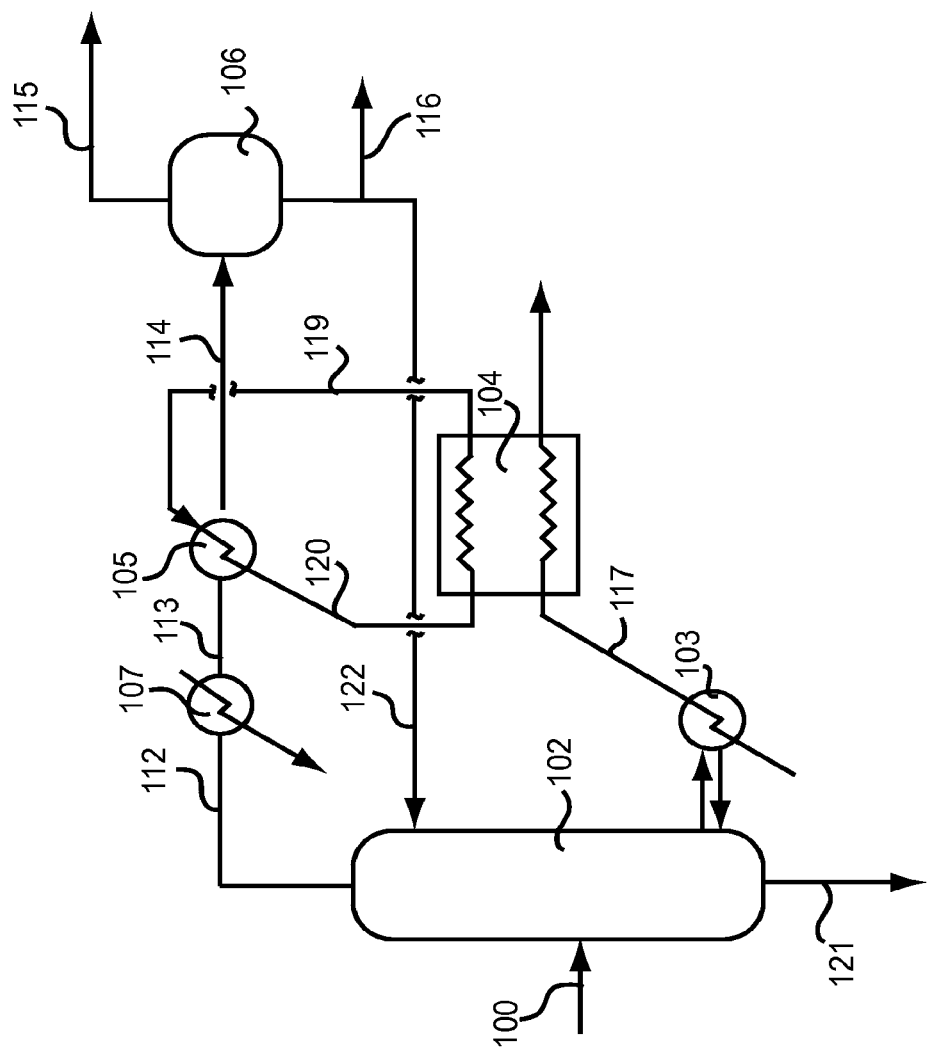
FIG. 1B schematically represents a separation unit comprising a separation column coupled with an absorption refrigeration unit according to another embodiment of the present invention.

A recycling unit according to another embodiment of the invention is schematically illustrated in FIG. 1B. Said recycling unit comprises a distillation column 102, whose overhead vapor line is in thermal communication with chillers 107 and 105. Said overhead vapor line is further in communication with a separator 106. An absorption refrigeration unit 104 is connected between the chiller 105 and the column boiler 103. The hydrocarbon-containing feed stream 100 that is to be separated will generally be an overhead stream coming from a flash tank and purge columns of a polymerization reactor, wherein a stream containing solvent (solvent=diluent), polymer and unreacted monomers is flashed or otherwise treated to remove solvent or diluent and monomers there from. The hydrocarbon-containing feed stream 100 is fed to said distillation column 102. In an embodiment, said hydrocarbon-containing feed stream 100 is an overhead vapor stream removed from a first distillation zone. A bottom stream 121 comprising comonomer and substantially olefin-free hydrocarbon diluent is removed from said distillation column 102 and further recovered. An overhead vapor stream 112 comprising olefin monomers and diluent is removed from said distillation column 102 and cooled by an absorption refrigeration unit 104 in the condenser 105. In an embodiment, the overhead vapor stream 112 enters first chiller 107, and the chilled overhead vapor stream 113 enters the condenser 105 at for example about 28° C. and is cooled to temperature below 0° C. preferably, between −10° C. and −30° C. The cooled overhead vapor stream 114 is then sent to the separator 106 where the ethylene and liquid isobutane 116 are recovered and recycled to the reactor (not shown) and partly recycled 122 to the column 102, while the overhead vapor stream 115 from the separator 106 is sent to the ERU (ethylene recovery unit). The reboiler 103 of the column 102 is thermally connected 117 to the absorption refrigeration unit 104, providing the heat to drive said refrigeration unit 104. A stream of coolant fluid circulates between absorption unit 104 and condenser 105. In the case of an ammonia system, liquid ammonia 119 is fed to the condenser 105, and gaseous ammonia 120 is redirected to the absorption unit 104.

Figure 2A:
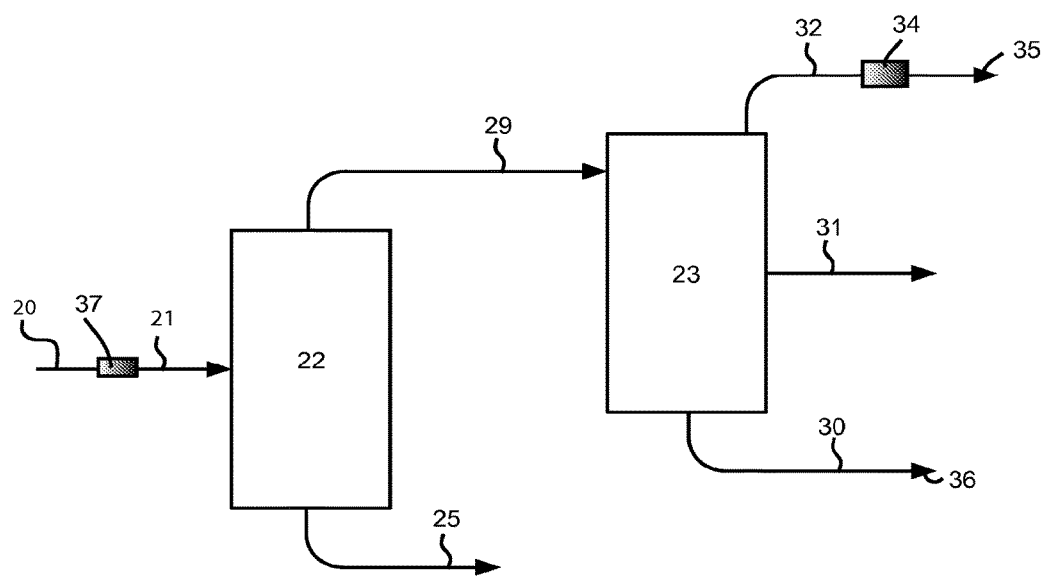
FIG. 2A schematically represents a separation unit comprising two distillation columns, one of which is coupled to an absorption refrigeration unit according to an embodiment of the present invention.

As illustrated in FIG. 2A, a recycling unit according to an embodiment of the invention can be composed of two distillation columns 22, 23, and of an ethylene recovery unit represented by the arrow 35. The hydrocarbon-containing feed stream 20 to be separated will generally be an overhead stream coming from a flash tank and purge columns of a polymerization reactor (not shown), wherein a stream containing solvent, polymer and unreacted monomers is flashed or otherwise treated to remove solvent or diluent and monomers therefrom. A first distillation column 22 realizes a rough cut between a mixture of isobutane, hexene and the heavies, which exit as liquid bottom product 25. The heavy bottom product 25 can be further treated (not shown). The remaining monomer, isobutane, with all light components, 29 which exits from the top of the first distillation column 22, is sent to a second distillation column 23 as a vapor stream for further separation. The second distillation column 23 will generate three product streams. More in particular, this column 23 is used to separate olefin-free isobutane diluent from isobutane diluent containing residual amounts of (co-)monomer and from a light vapor stream comprising monomer, additional residual isobutane and further components such as formaldehyde, $H_2$, $N_2$, $O_2$, CO and $CO_2$. Substantially pure isobutane, so-called "substantially olefin-free" isobutane is obtained as liquid bottom product 30. Light components such as formaldehyde, $H_2$, $N_2$, $O_2$, CO and $CO_2$ exit the distillation column 23 with ethylene and some residual isobutane as a vapor stream 32, which according to an embodiment of the invention are further cooled using an absorption refrigeration unit 34 before being further purified and separated in an ethylene recovery unit represented by the arrow 35. In an embodiment, the overhead vapor stream 32 enters a condenser chilled by the absorption refrigeration unit 34 at for example about 28° C. and is cooled to temperature below 0° C. preferably, between −10° C. and −30° C. The cooled overhead vapor stream is then sent to an ethylene recovery unit 35. Said ethylene recovery unit preferably comprising a vent condenser (not shown) where the ethylene and liquid isobutane are separated, and the overhead vapor stream from the vent condenser is sent to the ERU (ethylene recovery unit). In an embodiment, the ethylene recovery unit 35 can be avoided. The chilling of stream 32 with absorption refrigeration unit 34 decreases dramatically the stream to be further separated, leading to a competitive process in terms of ethylene recovery without ethylene recovery unit.

In an embodiment, the reboiler (not shown) of the first column 22 can be thermally connected to the absorption refrigeration unit 34, providing the heat to drive said refrigeration unit 34. The absorption refrigeration unit can also be powered by an alternative hot source.

Remaining isobutane exits the column 23 as a liquid side stream 31. The distillation process in the second distillation column thus permits to separate substantially olefin-free isobutane diluent in a bottom stream 30 as well as isobutane diluent containing residual amounts of ethylene in a side stream 31. Both the substantially olefin-free isobutane diluent 30 and the isobutane diluent 31 can be recycled and re-used in a polymerization process. In addition, isobutane diluent and ethylene monomer which are separated from the vapor stream 32 are also recycled and re-used in a polymerization process. In another embodiment, the hydrocarbon-containing feed stream 20 that is to be separated can also be cooled prior to distillation using at least one absorption refrigeration unit 37, said cooled feed stream 21 can then be fed to the distillation column 22.

Figure 2B:
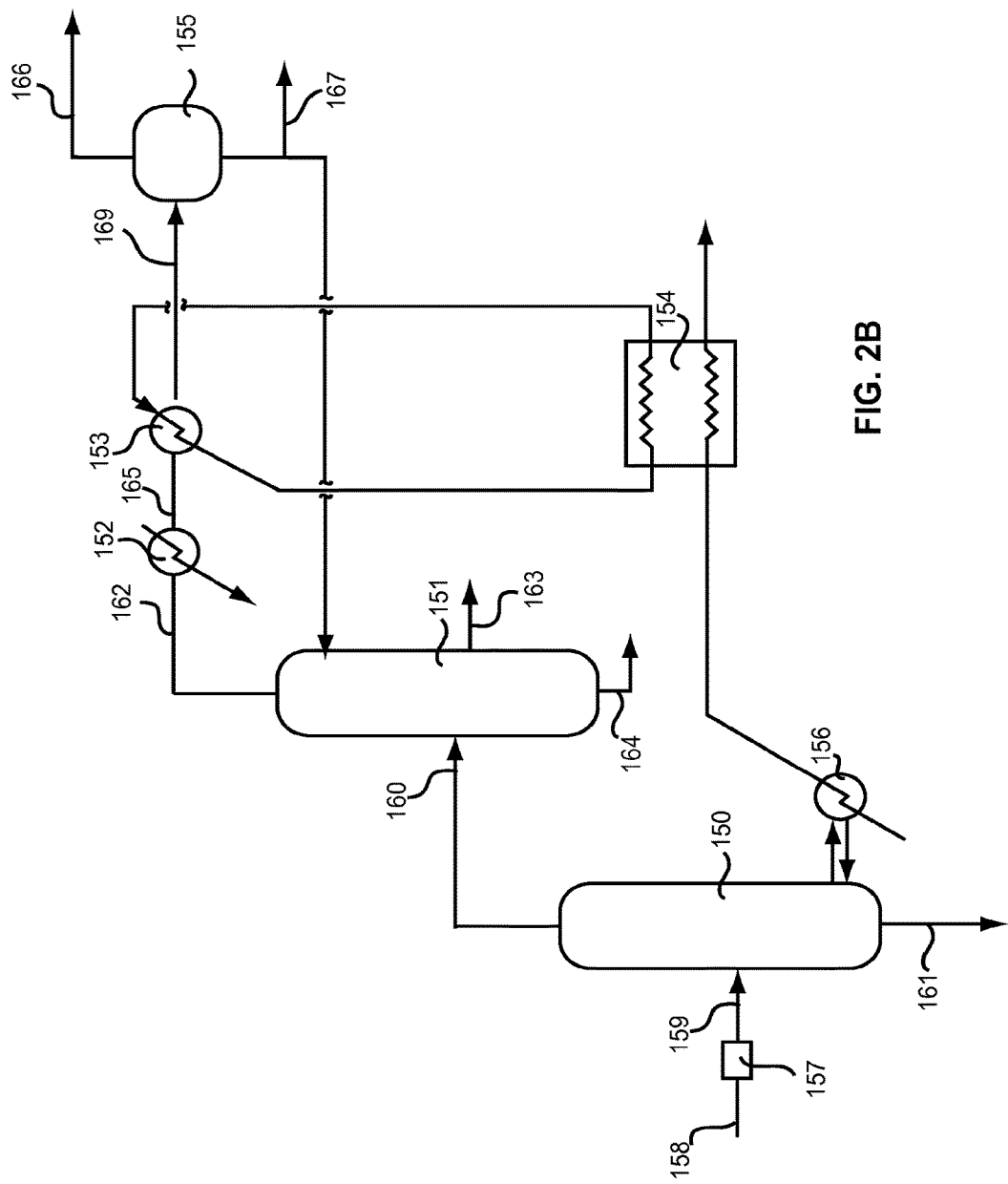
FIG. 2B schematically represents a separation unit comprising two distillation columns, one of which is coupled to an absorption refrigeration unit according to another embodiment of the present invention.

As illustrated in FIG. 2B, a recycling unit according to another embodiment of the invention can be composed of two distillation columns 150, 151 and of an ethylene recovery unit represented by the arrow 168. The hydrocarbon-containing feed stream 158 to be separated will generally be an overhead stream coming from a flash tank and purge columns of a polymerization reactor (not shown). A first distillation column 150 realizes a rough cut between a mixture of isobutane, hexene and the heavies, which exit as liquid bottom product 161. The heavy bottom product 161 can be further treated (not shown). The remaining monomer, isobutane with all light components 160, which exits from the top of the first distillation column 150, is sent to a second distillation column 151 as a vapor stream 160 for further separation. The second distillation column 151,—whose overhead vapor line is in thermal communication with chillers 152 and 153—will generate three product streams. Substantially pure isobutane, so-called "substantially olefin-free" isobutane is obtained as liquid bottom product 164. Light components such as formaldehyde, $H_2$, $N_2$, $O_2$, CO and $CO_2$ exit the distillation column 151 with ethylene and some residual isobutane as a vapor stream 162, which according to an embodiment of the invention is further cooled using an absorption refrigeration unit 154. Said absorption refrigeration unit 154 is connected between the chiller 153 and the column boiler 156 of the first column 150. In an embodiment, the overhead vapor stream 162 enters first chiller 152, and the chilled overhead vapor stream 165 enters the condenser 153 at for example about 28° C. and is cooled to temperature below 0° C. preferably, between −10° C. and −30° C. The cooled overhead vapor stream 169 is then sent to a separator 155 where the ethylene and liquid isobutane 167 are separated, and the overhead vapor stream from the separator 166 is sent to the ERU 168.

In an embodiment, the ethylene recovery unit 168 can be avoided. The chilling of stream 165 with absorption refrigeration unit 154 decrease dramatically the stream 166, leading to a competitive process in terms of ethylene recovery without ethylene recovery unit. In this embodiment, the reboiler 156 of the first column 150 is thermally connected to the absorption refrigeration unit 154, providing the heat to drive said refrigeration unit 154. The absorption refrigeration unit can also be powered by an alternative hot source. Remaining isobutane exits the column 151 as a liquid side stream 163. The distillation process in the second distillation column thus permits to separate substantially olefin-free isobutane diluent in a bottom stream 164 as well as isobutane diluent containing residual amounts of ethylene in a side stream 163. Both the substantially olefin-free isobutane diluent 164 and the isobutane diluent 163 can be recycled and re-used in a polymerization process. In an embodiment, the hydrocarbon-containing feed stream 158 that is to be separated can also be cooled prior to distillation using at least one absorption refrigeration unit 157, said cooled feed stream 159 can then be fed to the distillation column 150.

Figure 3:
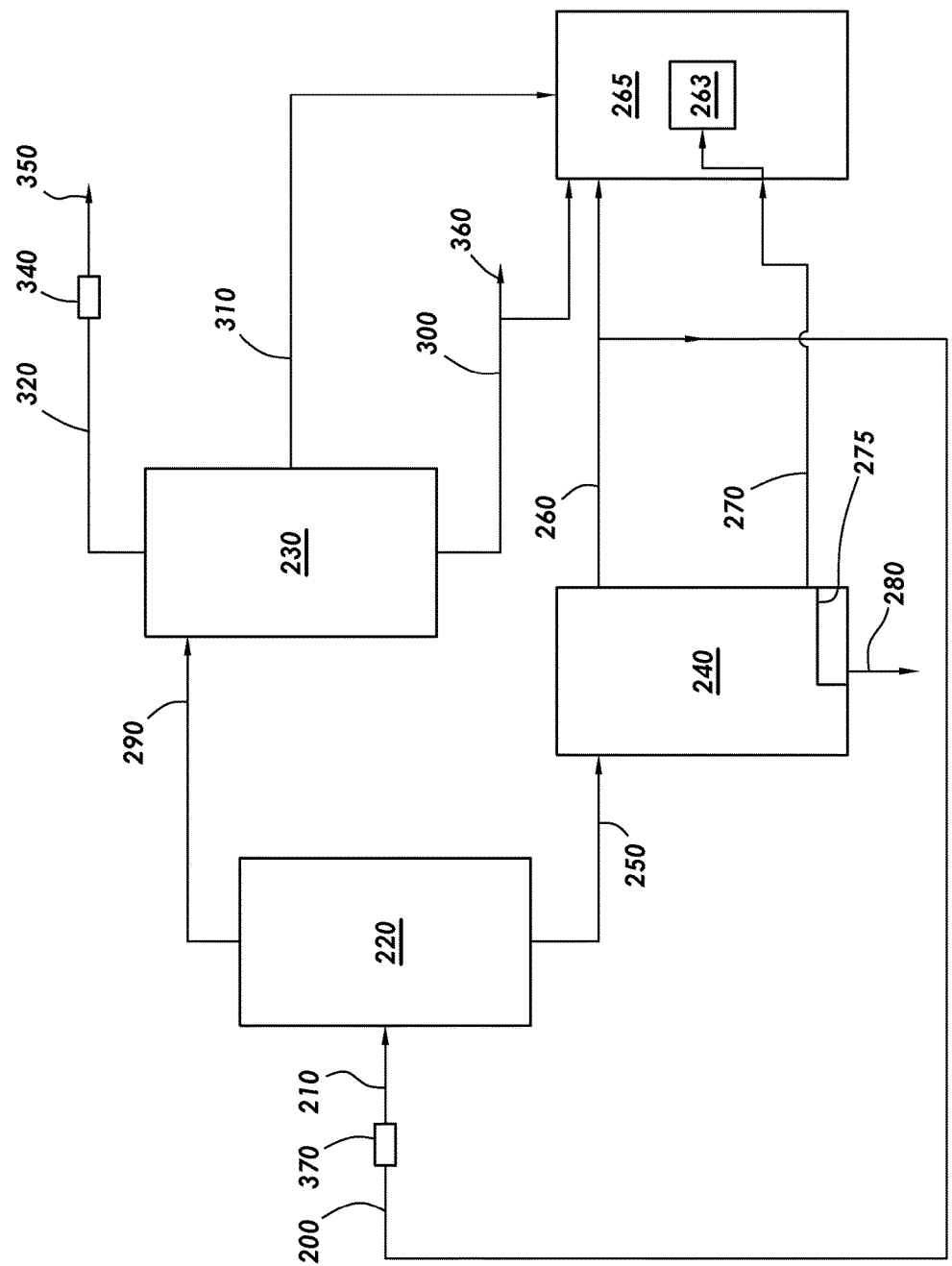
FIG. 3 schematically represents a separation unit comprising three distillation columns, one of which is coupled to an absorption refrigeration unit according to an embodiment of the present invention.

As illustrated in FIG. 3, a recycling unit according to an embodiment of the invention can be composed of three distillation columns 220, 230, 240, in addition to an ethylene recovery unit represented by the arrow 350. The hydrocarbon-containing feed stream 200 that is to be separated will generally be an overhead stream coming from a flash tank and purge columns of a polymerization reactor 263, wherein a stream containing solvent, polymer and unreacted monomers is flashed or otherwise treated to remove solvent or diluent and monomers therefrom. A first distillation column 220 realizes a rough cut between a mixture of isobutane, hexene and the heavies, which exit as liquid bottom product 250. The heavy bottom product is further treated in a second distillation column 240 and separated into three product streams. Isobutane vapor exiting as top product 260 makes the feed stream of the first column 220, or is recycled to a polymerization zone 265. A purified liquid hexene stream 270 is recovered from a tray just above the column sump 275 and sent to storage or recycling to the polymerization reactor(s) 263. The heavy components 280 are recovered from the column 240 sump 275 with the draining procedure being triggered on high column bottoms temperature. The remaining monomer, isobutane, with all light components, which exits from the top 290 of the first distillation column 220, is sent to a third distillation column 230 as a vapor stream for further separation. The third distillation column 230 is used to generate three product streams. More in particular, this column 230 is used to separate olefin-free isobutane diluent from isobutane diluent containing residual amounts of (co-)monomer and from a light vapor stream comprising monomer, additional residual isobutane and further components such as formaldehyde, $H_2$, $N_2$, $O_2$, CO and $CO_2$. Substantially pure isobutane, so-called "substantially olefin-free" isobutane is obtained as liquid bottom product 300. Light components such as formaldehyde, $H_2$, $N_2$, $O_2$, CO and $CO_2$ exit the distillation column 230 with ethylene and some residual isobutane as a vapor stream 320, which according to an embodiment of the invention are further cooled using an absorption refrigeration unit 340 before being further purified and separated in an ethylene recovery unit represented by the arrow 350. Remaining isobutane exits the column 230 as a liquid side stream 310. The distillation process in the third distillation column thus permits to separate substantially olefin-free isobutane diluent in a bottom stream as well as isobutane diluent containing residual amounts of ethylene in a side stream. Both the substantially olefin-free isobutane diluent and the isobutane diluent are recycled and re-used in a polymerization process 265. In addition, isobutane diluent and ethylene monomer which are separated from the vapor stream 302 are also recycled and re-used in a polymerization process 265. In another embodiment, the hydrocarbon-containing feed stream 200 that is to be separated can also be cooled using at least one absorption refrigeration unit 370, said cooled feed stream 210 can then be fed to the distillation column 220. The reboiler (not shown) of the column 240 is preferably thermally connected to the absorption refrigeration unit 340, providing the heat (heat of condensates) to drive said refrigeration unit 340. The absorption refrigeration unit can also be powered by an alternative hot source.

The present invention therefore also provides a polyolefin production process, comprising the steps of introducing into a reactor one or more olefin reactants, polymerization catalysts and diluents, and while circulating said reactants, catalysts and diluents, polymerizing one or more olefin reactants to produce a polymer slurry comprising essentially liquid diluent and solid olefin polymer particles, recovering olefin polymer particles from the slurry by separating at least a majority of the diluent from the slurry in a hydrocarbon-containing feed stream, distilling said hydrocarbon-containing feed stream, removing an overhead vapor stream comprising olefin monomer and diluent from said distillation step, distilling said removed overhead vapor stream, removing a second overhead vapor stream and cooling the temperature of said removed second overhead vapor stream using an absorption refrigeration cycle prior to separating said olefin monomer and diluent in said removed vapor stream.

In an embodiment, said process comprises the steps of cooling the temperature of said hydrocarbon-containing feed stream, using an absorption refrigeration cycle prior to said first distillation.

While the invention has been described in terms of the presently preferred embodiment, reasonable variations and modifications are possible by those skilled in the art and such variations are within the scope of the described invention and the appended claims.

This invention can be further illustrated by the following examples of preferred embodiments thereof, although it will be understood that this example is included merely for purposes of illustration and are not intended to limit the scope of the invention unless otherwise specifically indicated.

EXAMPLES

Example 1

An absorption refrigeration unit is provided between a distillation column and a vent condenser in a recycling unit of an olefin polymerization process, preferably a polyethylene production process. The absorption refrigeration units are powered by low pressure steam or hot water providing from the reboiler of a distillation column. The example developed here relies on ammonia-water system. Absorption refrigeration units with ammonia are able to produce cold source between 0° C. and −60° C. (negative cold), preferably between 0° C. and −30° C., more preferably between −10° C. and −20° C., such that the overhead vapor stream directed to the vent condenser and consequently to the ERU (Ethylene recycling unit) is at temperatures below 0° C. This system has the further advantage that is uses hot water that is available in the vicinity of the condenser, for instance the condensates from the reboiler of the distillation column.

A recycling unit according to an embodiment of the invention is illustrated in FIG. 1A, wherein a separation column 2 and a "vent condenser" 6 are indicated and the absorption refrigeration unit 4 is provided between said separation column 2 and the vent condenser 6. This recycling unit setup can be used to recover a large part or most of the isobutane. The overhead vapor stream 3 enters the absorption refrigeration unit 4 at about 28° C. and is cooled to temperature below 0° C. preferably, between −10° C. and −20° C. The cooled overhead vapor stream 5 is then sent to the vent condenser 6 where the ethylene and liquid isobutane 8 are recovered 12, while the overhead vapor stream 7 from the condenser 6 are sent to the ERU 11. Table 1 shows the composition of the streams in said recycling unit.

TABLE 1

| Stream | Number on FIG. 1A | Composition |
|---|---|---|
| hydrocarbon-containing feed stream | 1 | $C_2^=$, $iC_4$, ε light, ε $C_6^+$, ε $H_2$ ... |
| overhead vapor stream | 3 = 5 | light, $C_2^=$, $iC_4$, ε $H_2$ |
| bottom stream | 9 | $iC_4$ |
| overhead stream from the vent condenser | 7 | $C_2^=$, $iC_4$, $H_2$, $N_2$, $C_2$ |
| bottom stream from the vent condenser | 8 | $iC_4$, $C_2^=$, $C_2$ |

ε means a small quantity

As illustrated in Table 2, the advantage of cooling the overhead vapor stream from the separation column permit to condense and recover the maximum of isobutane and therefore minimizing the quantity of isobutane sent to the ERU. Table 2 shows the results when cooling the overhead stream below 0° C. according to an embodiment of the invention.

TABLE 2

| T (° C.) | $C_2$ (Stream 7) (kg/h) | $iC_4$ (Stream 7) (kg/h) | % Δ ($C_2$) | % Δ ($iC_4$) |
|---|---|---|---|---|
| −60 | 182 | 2.9 | 69 | 98.8 |
| −50 | 316 | 7.6 | 47 | 96.7 |
| −40 | 478 | 21 | 19 | 91.2 |
| −30 | 539 | 45 | 9 | 81 |
| −20 | 564 | 83 | 5 | 64.6 |
| −10 | 579 | 140 | 2.4 | 40 |
| 1 | 593 | 235 | 0 | 0 |

The use of said refrigeration unit for the chilling below 0° C. the overhead vapor stream coming from the distillation column decreases the quantity of isobutane that is sent to the ERU as shown in Table 2.

Example 2

Another embodiment of the invention is described in this example. The hydrocarbon-containing feed stream providing from the flash tank downstream a polymerization reaction is cooled using an absorption refrigeration unit positioned before a first separation column. In the recycling unit the efficiency of two-stage compressors of the isobutane recycling stream (hydrocarbon containing feed stream) is improved by the installation of an absorption refrigerating unit for cooling said isobutane stream.

This embodiment according to the invention comprises providing one absorption refrigeration unit in front of the first stage of the compressors, and one absorption refrigeration unit between the two stages. These enable the gas at the intake of the first stage to be cooled, and then the gas leaving the first stage is further cooled by the second refrigeration unit. This configuration allows the increase of the capacity of the compressors by at least 16.5%. In an embodiment a purge system is further provided between the second refrigeration unit and the second stage compressor.

Example 3

Another embodiment of the invention is described in this example wherein a side stream removed from a distillation column is cooled using an absorption refrigeration unit. Water and lithium bromide are used as working fluids in said absorption refrigeration cycle.

The cooling of this side streams prevents any pressure increase of the mixture of olefins and diluent. Since this stream is recycled to the reactor, a chilling of this stream also contributes to the reactor refrigeration. A temperature decrease of this stream by 20° C. increases the cooling capacity of the polymerization reactor by 1%.

The invention claimed is:

1. A process comprising:
    cooling a hydrocarbon-containing feed stream in a first absorption recycle cycle, the hydrocarbon-containing feed stream comprising isobutane, ethylene, hexene, and further comprising $H_2$, $N_2$, O2, CO, $CO_2$, formaldehyde, or combinations thereof to form a cooled hydrocarbon-containing feed stream,
    compressing the cooled hydrocarbon-containing feed stream to form a compressed hydrocarbon-containing feed stream,
    distilling the compressed hydrocarbon-containing feed stream in a first distillation column to remove a first bottom stream comprising hexene, and isobutane and an overhead stream comprising hexene, ethylene and isobutane, and further components comprising $H_2$, $N_2$, $O_2$, CO, $CO_2$, formaldehyde, or combinations thereof, the first distillation column comprising a reboiler,
    separating the first bottom stream into an isobutane stream and a liquid hexene stream, in a second distillation column, wherein the isobutane stream is a top product and the liquid hexene stream is taken from above a column sump,
    separating the overhead stream in a third distillation column into a vapor stream comprising ethylene, isobutane, and further comprising $H_2$, $N_2$, $O_2$, CO, $CO_2$, formaldehyde, or combinations thereof, a liquid side stream comprising isobutane, and a second bottom stream comprising olefin-free isobutane; and
    cooling the vapor stream using a second absorption refrigeration cycle.

2. The process of claim 1, wherein the overhead stream is cooled to a temperature of between 0° C. and −40° C.

3. The process of claim 1, wherein the first and second absorption refrigeration cycles are driven from heat recycled from the reboiler of the first distillation column.

4. The process of claim 1, wherein the first absorption refrigeration cycle utilizes water and lithium bromide as working fluids.

5. The process of claim 1, wherein the second absorption refrigeration cycle utilizes water and ammonia as working fluids.

6. The process of claim 1, wherein the hydrocarbon-containing feed stream is from a flash tank and purge columns of a polymerization reactor.

7. The method of claim 1, wherein the isobutane stream from the second distillation column is recycled to the hydrocarbon-containing feed stream or to a polymerization reactor.

8. The method of claim 1, wherein the liquid hexene stream is taken from one tray above the column sump.

9. The method of claim 8, wherein the liquid hexene stream is recycled to a polymerization reactor.

10. The method of claim 1, wherein the vapor stream is sent to an ethylene recovery unit.

11. The method of claim 1, wherein the liquid side stream comprising isobutane, and the second bottom stream comprising olefin-free isobutane are recycled to in a polymerization process.

* * * * *